(12) United States Patent
Batchelor et al.

(10) Patent No.: US 7,260,695 B2
(45) Date of Patent: Aug. 21, 2007

(54) SCANNING MODIFIED DATA DURING POWER LOSS

(75) Inventors: Gary W. Batchelor, Tucson, AZ (US);
Michael T. Benhase, Tucson, AZ (US);
Carl E. Jones, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 542 days.

(21) Appl. No.: 10/795,168

(22) Filed: Mar. 5, 2004

(65) Prior Publication Data

US 2005/0210323 A1    Sep. 22, 2005

(51) Int. Cl.
G06F 12/02 (2006.01)
G06F 12/16 (2006.01)
G06F 11/00 (2006.01)

(52) U.S. Cl. .................. 711/161; 711/104; 711/111; 714/14

(58) Field of Classification Search .......... 714/14; 711/104, 114
See application file for complete search history.

(56) References Cited

U.S. PATENT DOCUMENTS

| | | | |
|---|---|---|---|
| 5,535,399 A * | 7/1996 | Blitz et al. ............. | 714/6 |
| 5,930,824 A | 7/1999 | Anglin et al. | |
| 6,499,091 B1 | 12/2002 | Bergsten | |
| 6,526,487 B2 | 2/2003 | Ohran et al. | |
| 6,535,996 B1 | 3/2003 | Brewer et al. | |
| 2002/0069317 A1 * | 6/2002 | Chow et al. ............. | 711/104 |
| 2005/0005188 A1 * | 1/2005 | Hsu et al. ............... | 714/2 |

* cited by examiner

*Primary Examiner*—Matthew Kim
*Assistant Examiner*—Lev Iwashko
(74) *Attorney, Agent, or Firm*—Quarles & Brady Streich Lang LLP

(57) ABSTRACT

A back-up power source and a back-up storage device are utilized to power a processor and a volatile memory device during a primary power failure. An emergency data-storage algorithm is invoked to create a table of modified data analogous to data residing in a non-volatile memory device associated with a different processor. This table of modified data is written to the back-up storage device.

14 Claims, 5 Drawing Sheets

SCANNING MODIFIED DATA DURING POWER LOSS

BACKGROUND OF THE INVENTION

1. Field of the Invention

This invention is related in general to the field of data storage in computer systems. In particular, the invention consists of scanning a read/write cache during a power loss to construct and save a write cache analogous to one residing in a different processing device.

2. Description of the Prior Art

Computer storage systems typically include a high-capacity disk array for storing digital information. To provide redundancy, a computer storage system may utilize multiple data processing servers or may use a single processing server consisting of multiple processing clusters. Each data processing server or processing cluster may be substantially identical and redundant. Additionally, each processing cluster typically has access to the entire disk array.

It is customary for one or more hosts to send requests to the processing clusters to read data from or write data to the disk array. The requests are delivered to the processing clusters over a multi-path communication device such as a bus, switch, router, bridge, point-to-point network, local area network, or other similar connecting device. Once a cluster receives a read-data request, the relevant information is retrieved from the disk array and placed into a read/write memory cache. This read/write cache is relatively fast compared with other storage mechanisms and is typically volatile memory, i.e., data stored in this cache will become corrupted should the cache lose electrical power. Accessing the data from the read/write cache is much faster than retrieving information directly from the disk array. The information is passed to the requesting host and a copy is maintained in the read/write cache in case it is again requested by a host. Because the information has not been modified, there is no need to maintain another copy of the data elsewhere in the computer storage system, other than the original copy residing in the disk array.

If a host transmits a write request to a processing cluster, either new information is being written to the disk array or information already residing in the disk array is being modified. These write request tasks are more critical than simple read requests, as a failure to deliver the new or modified information to the disk array may result in a permanent loss of information. To provide redundancy, write requests may be sent to a primary processing cluster and a secondary processing cluster. The primary processing cluster places the new data in its volatile read/write cache and then transfers it to the disk array.

While the new information is being written to the volatile read/write cache of the primary processing cluster, a copy of the data is also written to a non-volatile memory device in the secondary processing cluster. The non-volatile memory device is intended to maintain a copy of the information in the event that electrical power to either processing cluster is interrupted. However, non-volatile memory is usually much smaller than volatile memory due to cost considerations.

In a truly redundant computer storage system, each processing cluster may dominate access to a portion of the disk array. If this cluster fails, then another cluster may access the portion of the disk array dominated by the first processing cluster. However, modified data which has not yet been written to the disk array may be lost, corrupted, or non-accessible. While the primary processing cluster maintains a copy of its own modified data, this copy resides in the volatile memory and is interspersed with read data. The typically smaller non-volatile memory only maintains write requests from other processing clusters. It is desirable that a processing cluster be able to retrieve modified data from the volatile read/write cache before it becomes corrupted due to a power loss. Additionally, it is desirable to save this modified data to a static storage device such as a hard-drive, floppy disk-drive, optical disk drive or a non-volatile memory device.

In U.S. Pat. No. 6,8535,996, James Brewer et al. disclose a method and system for protecting user data during power failures on a network-computer-class data processing system. The network-computer-class data processing system is integrated with a power supply having an early power-fail warning signal to ensure that unsaved changes to user data files are saved before a complete power failure strikes the data processing system.

An important aspect of Brewer's invention is that a table of file changes is maintained in non-volatile memory. The entire contents of the table are saved to non-volatile storage in the time interval between the early power-fail warning signal and the complete power failure. The table of user data changes can then be applied to recreate the user's data after power is restored. However, Brewer does not address recovering data which has been sent to more than one processing cluster. Additionally, the Brewer method requires consistent, persistent, and continuous overhead to maintain the table residing in non-volatile memory. Accordingly, it would be advantageous to incur this overhead only in the event of a power loss and provide a means of replicating information residing in the non-volatile memory of other processing clusters.

SUMMARY OF THE INVENTION

The invention disclosed herein is a computer storage system consisting of a multitude of storage processing devices such as either discrete storage servers or a multitude of processing clusters within a storage server. Each storage processing device includes a processor, a volatile memory device, and a non-volatile memory device. Access to and from the hosts is provided over a multi-path communication device. Additionally, each storage processing device maintains dominant access to a portion of a disk-array and subordinate access to the remaining portion of a disk-array. A back-up power source is utilized to power the processor, volatile memory device, non-volatile memory device, and a back-up storage device such as a hard-drive, floppy disk drive, optical disk drive, or similar digital storage device in the event of loss of primary electrical power.

Should a primary power failure occur, the back-up power source is activated and the volatile memory is scanned by the processor. Write requests residing in the read/write cache are accumulated and transferred to the back-up storage device.

One aspect of this invention is that modified data is only written to a back-up memory device during loss of primary power. Otherwise, no computer storage system resources are committed to this task. Another aspect of this invention is the ability to recreate the contents of write data residing in non-volatile memory of other storage processing devices.

Various other purposes and advantages of the invention will become clear from its description in the specification that follows and from the novel features particularly pointed out in the appended claims. Therefore, to the accomplishment of the objectives described above, this invention com prises the features hereinafter illustrated in the drawings, fully described in the detailed description of the preferred embodiments and particularly pointed out in the claims. However, such drawings and description disclose just a few of the various ways in which the invention may be practiced.

DESCRIPTION OF THE PREFERRED EMBODIMENTS

Figure 1:
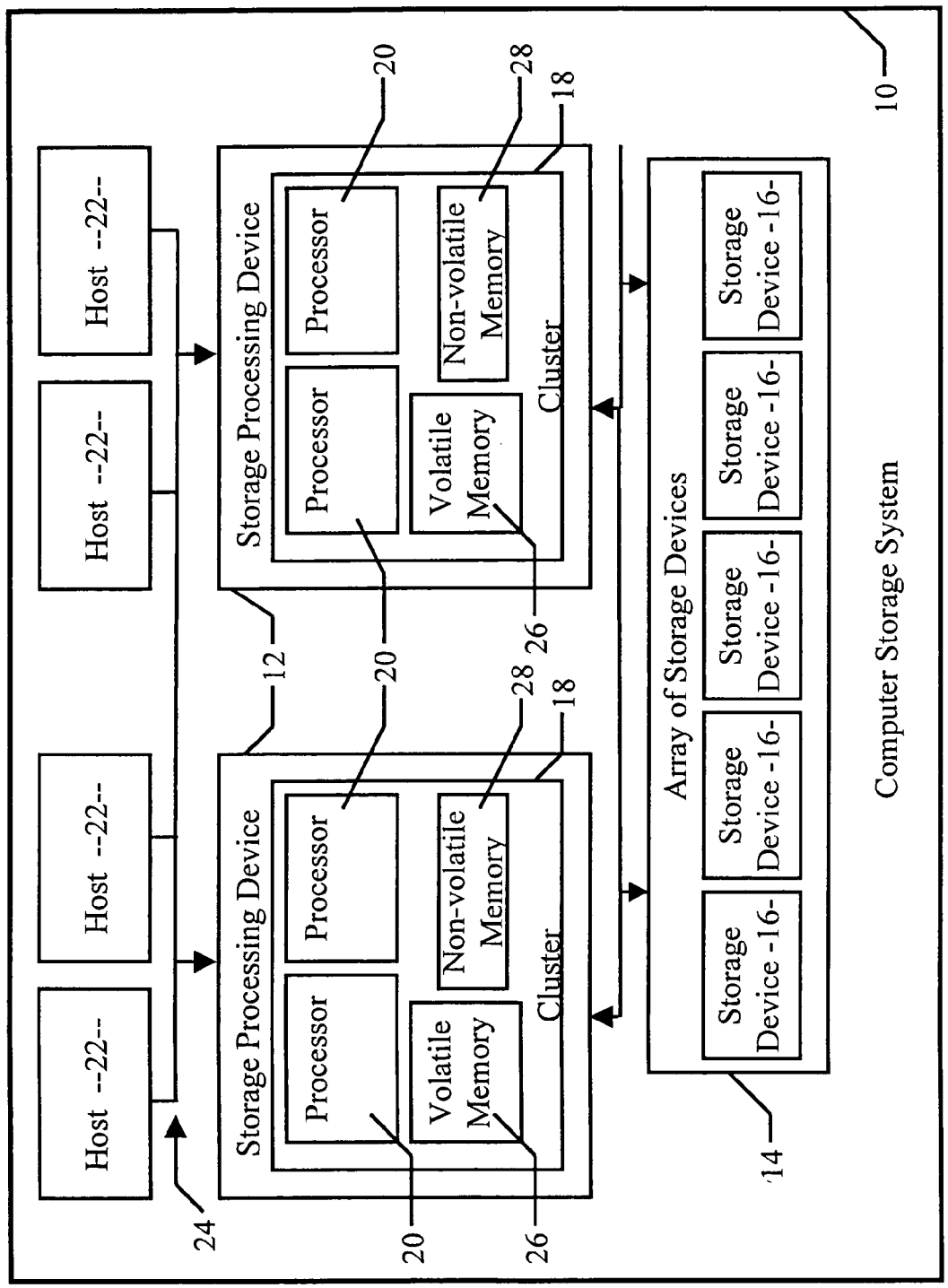
FIG. 1 is a schematic diagram of a computer storage system in accordance with the invention, wherein each of a plurality of storage processing devices is associated with a volatile memory device, a non-volatile memory device, and a disk array.

This invention is based on the idea of using a processing device, a back-up power source and a back-up storage device to replicate the contents of a non-volatile memory device from a volatile memory device. Referring to the figures, wherein like parts are designated with the same reference numerals and symbols, FIG. 1 is a schematic illustration of a computer storage system 10 including two or more storage processing devices 12 and an array 14 of high-capacity storage devices 16. Storage processing devices 12 may consist of discrete storage servers or clusters 18 of processors 20. Storage devices 16 may be hard-disk drives, tape cartridges, optical disk drives, or other high-capacity storage elements. Processors 20 may be general-purpose computer processing units ("CPUs"), microprocessors, field-programmable gate arrays ("FPGAs"), complex programmable logic devices ("CPLDs"), application-specific integrated circuits ("ASICs), or other computational device. Accordingly, algorithms run by the processors 20 may be either hardware constructs or software constructs.

In this embodiment of the invention, the array 14 of high-capacity storage devices 18 is accessible by all storage processing devices 12. However, each storage processing device 12 maintains a dominant communication channel with a portion of the array 14. Read/write data requests generated by a host 22 travel over a multi-path communication channel 24 to the storage processing devices 12. If a host 22 requests data residing in the array 14 of storage devices 16, the request is routed to the storage processing device 12 which dominates that portion of the array 14.

Read data requests invoke an algorithm within a processor 20 that first copies the requested data to a volatile memory device 26. The information is then transferred from the volatile memory device 26 to the requesting host 22. A copy of the requested data is maintained in the volatile memory device 26 for later use by any of the hosts 22.

Write data requests initiate a processor 20 to place a copy of the modified data in its associated volatile memory device 26. Concurrently, another storage processing device places a redundant copy of the modified data in a non-volatile memory device 28. In this manner, should the first storage processing device fail, the secondary storage processing device allows the computer storage system 10 to access the modified data. Additionally, the second storage processing device can access information stored on the array 14 of storage devices 16 originally dominated by the first storage processing device.

In this embodiment of the invention, the first storage processing device and second storage processing device are identical and redundant. Each storage processing device 12 is a first/primary storage processor device for data residing within its portion of the array 14 and a secondary storage processing device for data residing within a portion of the array dominated by another storage processing device.

Figure 2:
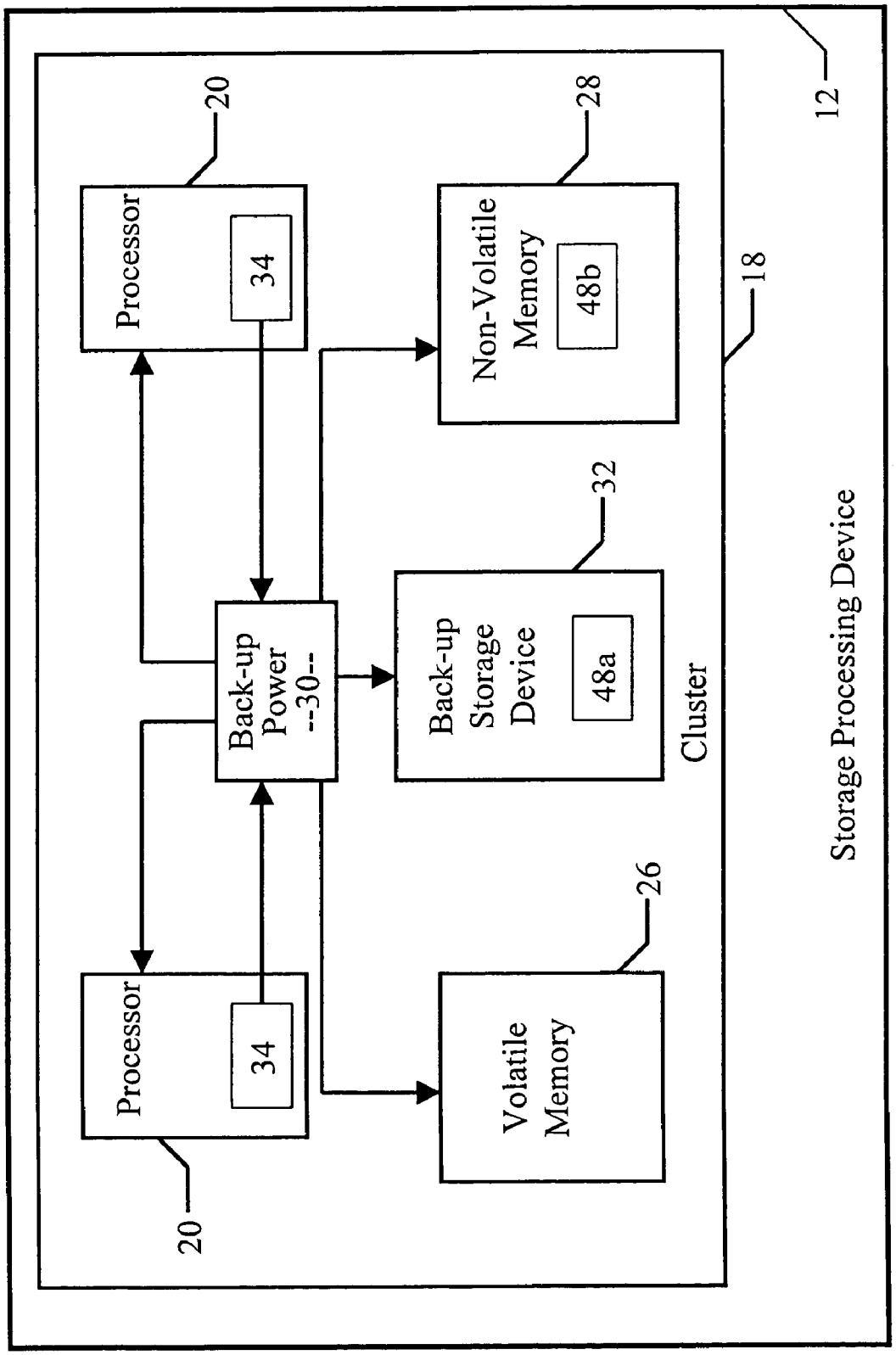
FIG. 2 is a schematic diagram of one of the storage processing devices presented in FIG. 1 illustrating the utilization of a back-up power source and a back-up storage device in accordance with the invention.

FIG. 2 is a schematic illustration of the storage processing device 12 adapted to implement a back-up power source 30 and a back-up storage device 32. The back-up power source may be a battery or other secondary source of electrical power such as an electrical connection powered independently from the primary power source. Should the primary power source fail, the back-up power source 30 is responsible for providing electrical energy to the processors 20, volatile memory device 26, non-volatile memory device 28, and back-up storage device 32. The back-up storage device 32 may be a hard-disk, an array of hard-disks, a floppy disk drive, an optical drive, a tape cartridge, a non-volatile memory device, or other similar form of static memory. Tables of modified data 48a,48b are optional data structures discussed in reference to the algorithms introduced in FIGS. 4 and 5 below.

Figure 3:
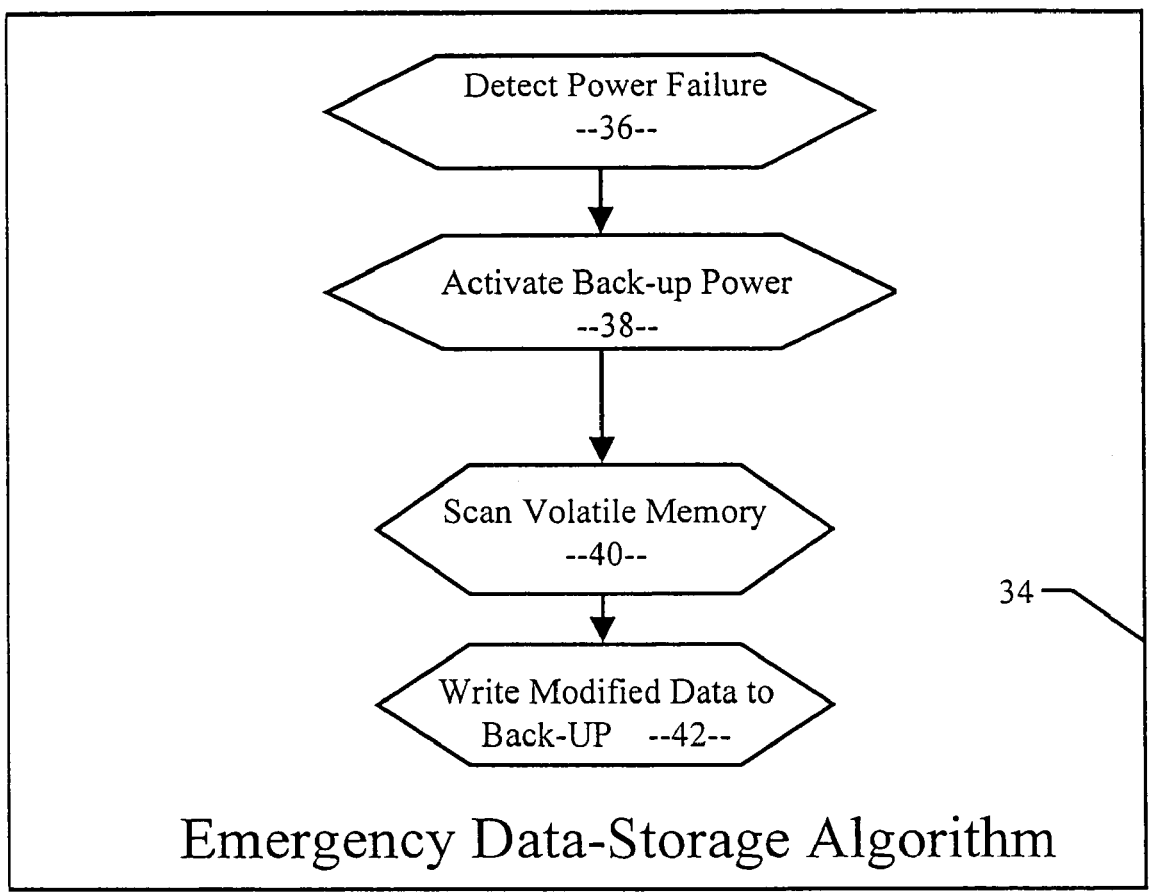
FIG. 3 is a flow-chart illustrating a process of scanning a volatile memory device residing in a first storage processing device and transferring modified data to a back-up storage device in accordance with the invention.

Processors 20 are tasked with detecting a loss of primary power and initiating an emergency data-storage algorithm 34 as illustrated in the flow-chart of FIG. 3. In step 36, the processor 20 detects a primary power failure. In step 38, the back-up power source 30 is activated to power the processor 20, the volatile memory device 26, and the back-up storage device 32. The processor 20 then scans the volatile memory device 26 in step 40, looking for modified data records. Modified data records are written to the back-up storage device 32 in step 42. Without the back-up storage device 32, the back-up power source 30 would be required to maintain power to the entire array 14 of high-capacity storage devices 16 while modified data is accumulated and written to the array 14.

Figure 4:
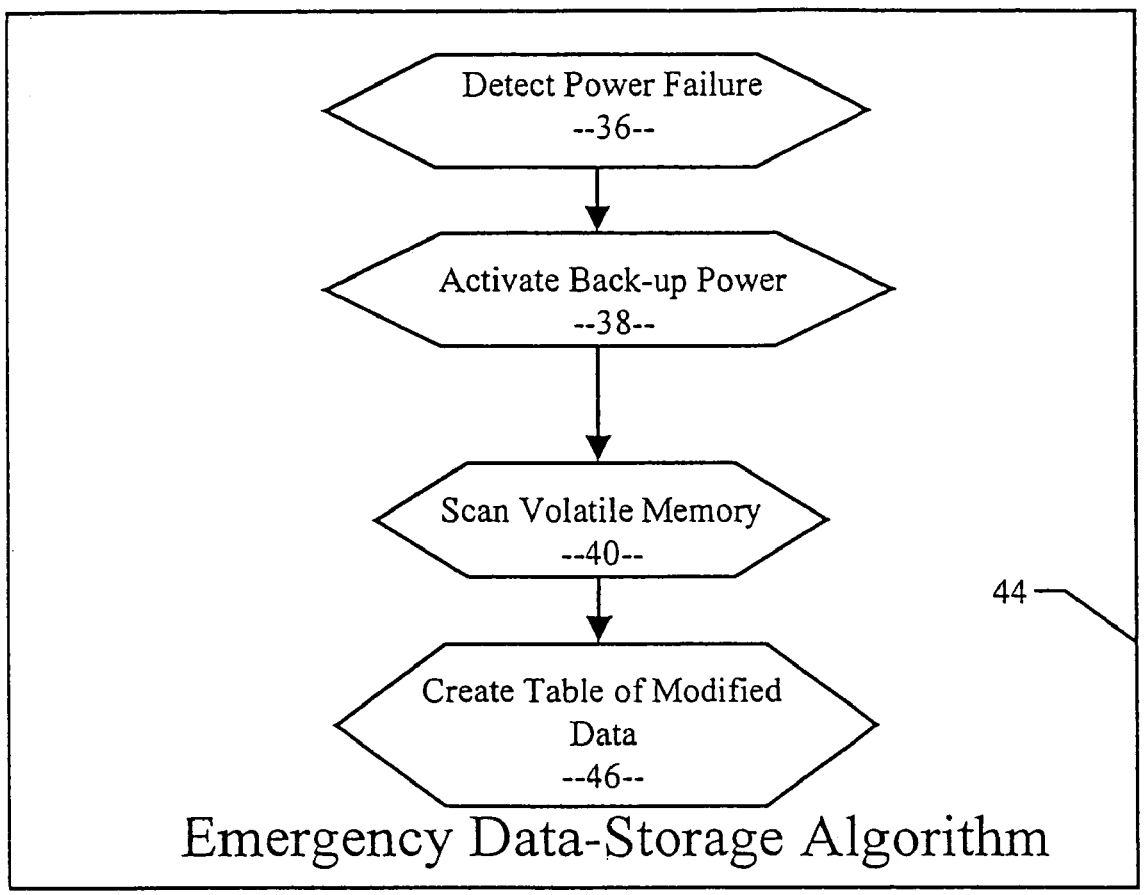
FIG. 4 is a flow-chart illustrating the scan and transfer process of FIG. 3 wherein the algorithm includes building a table of modified data analogous to contents of a non-volatile memory device residing in a different storage processing device.

FIG. 4 is a flow-chart illustrating another embodiment of an emergency data-storage algorithm 44. In step 46, a processor 20 builds a table of modified data 48a (FIG. 2) analogous to the contents of a non-volatile memory device 28 associated with a different storage processing device. This effectively replicates the modified data residing in the non-volatile memory device of the other storage processing device without communicating over the multi-path communication channel 24 or accessing the array 14 of high-capacity storage devices 16.

Figure 5:
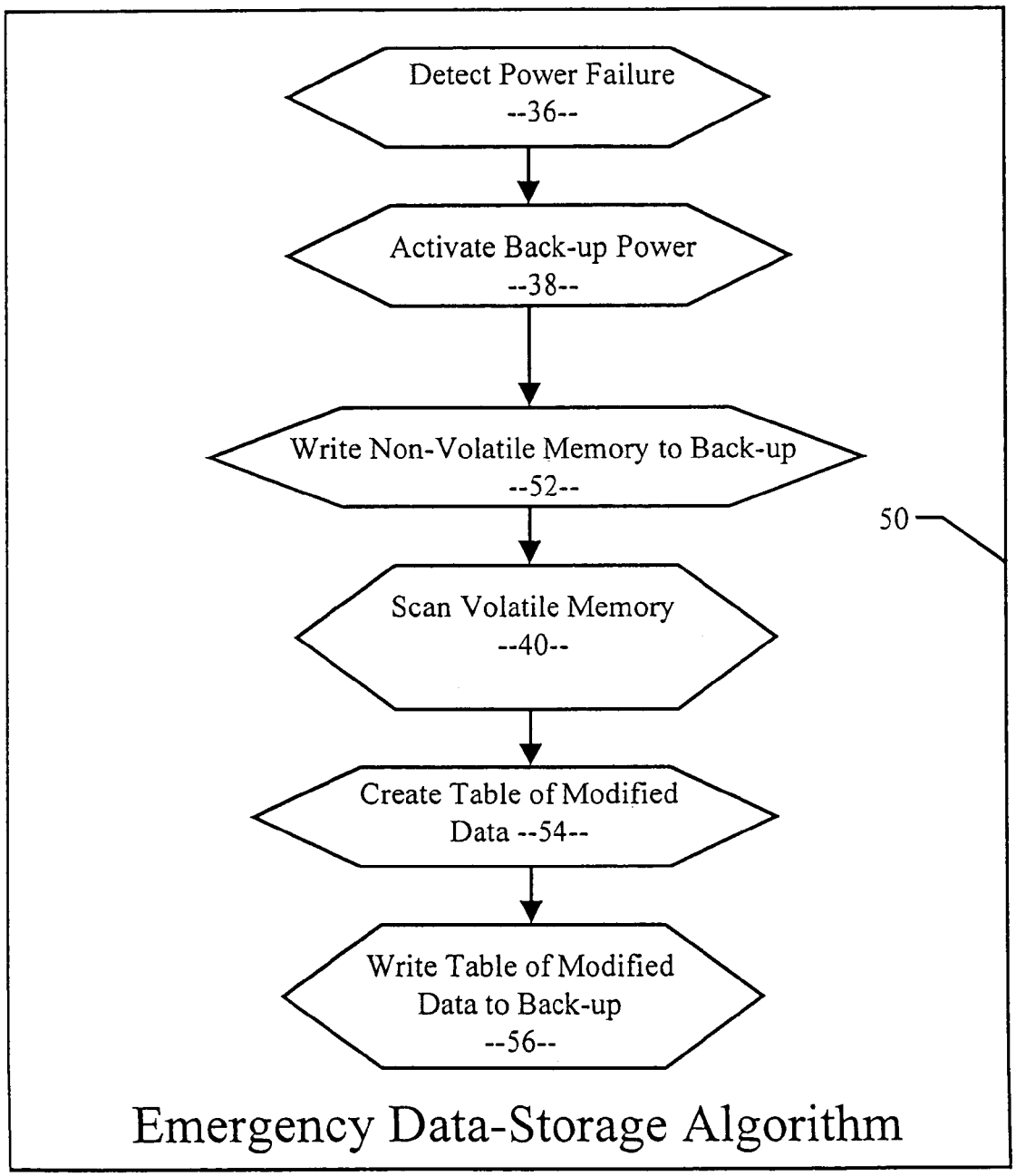
FIG. 5 is a flow-chart illustrating the scan and transfer process of FIG. 4 including the steps of first transferring the contents of a non-volatile memory device associated with the first storage processing device to the back-up storage device and then utilizing the associated non-volatile memory device to construct the table of modified data.

Yet another embodiment of an emergency data-storage algorithm 50 is illustrated in the flow-chart of FIG. 5. Data residing in the non-volatile memory device 28 associated with a first processor 20 is transferred to the back-up storage device 32 in step 52. The processor 20 then scans the volatile memory device 26 looking for data records that have been modified in step 40. In step 54, these modified data records are placed in the non-volatile memory device 28, creating a table of modified data 48b (FIG. 2). The table of modified data 48b is written, in step 56, to the back-up storage device 32.

Those skilled in the art of making computer storage systems may develop other embodiments of the present invention. For example, each processor may be associated with its own volatile or non-volatile memory device. Additionally, the invention can be implemented as a single storage server with each cluster containing only a single processor.

The terms and expressions which have been employed in the foregoing specification are used herein as terms of description and not of limitation, and there is no intention in the use of such terms and expressions of excluding equivalents of the features shown and described or portions thereof, it being recognized that the scope of the invention is defined and limited only by the claims which follow.

We claim:

1. A computer system having an array of storage devices, comprising:
   a first computer processing device adapted to include an emergency data-storage algorithm, the first computer processing device operating as a primary processor for data residing within a first portion of the array of storage devices;
   a volatile storage device associated with said first computer processing device;
   a second computer processing device identical and redundant to the first computer processing device, the second computer processing device operating as a secondary processor for data residing within a second portion of the array of storage devices, the second portion dominated by the second computer processing device;
   a first non-volatile storage device associated with said second computer processing device;
   a back-up power source;
   and a back-up storage device;
      wherein said back-up power source is adapted to be activated in response to a failure of a primary power source,
      the first computer processing device is programmed to detect the failure of the primary power source and invoke the emergency data-storage algorithm,
      the emergency data-storage algorithm is structured to subsequently direct the first computer processing device to scan the volatile storage device, looking for modified data records, and
      the first computer processing device is programmed to subsequently transfer said modified data records to said back-up storage device, said transferred modified data records being analogous to data stored in the first non-volatile storage device.

2. The computer system of claim 1, wherein said first computer processing device and said second computer processing device are storage servers.

3. The computer system of claim 1, wherein said first computer processing device and said second computer processing device are clusters, each cluster including at least one processor.

4. The computer system of claim 1, wherein said volatile storage device is a read/write cache.

5. The computer system of claim 1, wherein said first non-volatile storage device is a write cache.

6. The computer system of claim 1, wherein said back-up power source is a battery.

7. The computer system of claim 1, wherein said back-up power source is an electrical connection powered independently from said primary power source.

8. The computer system of claim 1, wherein said transferred modified data records are stored in a table of modified data residing in said back-up storage device.

9. The computer system of claim 1, wherein, subsequent to said first computer processing device invoking said emergency data-storage algorithm and prior to said emergency data-storage algorithm directing said first computer processing device to scan said volatile storage device, said first computer processing device transfers data stored in a second non-volatile storage device associated with the first computer processing device to the backup storage device.

10. The computer system of claim 9, wherein, subsequent to said emergency data-storage algorithm directing said first computer processing device to scan said volatile storage device and prior to said first computer processing device transferring said modified data records to the back-up storage device, said first computer processing device creates a table of modified data in said second non-volatile storage device.

11. A computer storage system having an array of storage devices, comprising:
   a first storage processing device including a first processor programmed, to include an emergency data-storage algorithm, the first storage processing device operating as a primary processor for data residing within a first portion of the array of storage devices;
   a volatile memory device associated with said first storage processing device;
   a second storage processing device identical and redundant to the first storage processing device, the second storage processing device operating as a secondary processor for data residing within a second portion of the array of storage devices, the second portion dominated by the second storage processing device;
   a first non-volatile memory device associated with said second storage processing device;
   a back-up power source; and
   a back-up storage device;
      a back-up power source is adapted to be activated in response to a failure of a primary power source,
      the first processor is programmed to detect the failure of the primary power source and invoke the emergency data-storage algorithm,
      the emergency data-storage algorithm is structured to subsequently direct the first processor to scan the volatile memory device, looking for modified data records, and
      the first processor is subsequently programmed to transfer said modified data records to said back-up storage device, said transferred modified data records being analogous to data stored in the first non-volatile memory device,
      wherein subsequent to said first processor invoking said emergency data-storage algorithm and prior to said emergency data-storage algorithm directing said first processor to scan said volatile memory device, said first processor transfers data stored in a second non-volatile memory device associated with the first storage processing device to the back-up storage device.

12. The computer storage system of claim 11, wherein, subsequent to said emergency data-storage algorithm directing said first processor to scan said volatile memory device and prior to said first processor transferring said modified data records to the back-up storage device, said first processor creates a table of modified data in said second non-volatile memory device and said modified data records are subsequently transferred to said back-up storage device in the form of said table of modified data.

13. A method of capturing volatile information, comprising:

detecting a failure of a primary power source;

subsequently invoking a back-up power source and an emergency data-storage algorithm;

transferring data stored in a first non-volatile memory device associated with a first computer processing device to a back-up storage device, the first computer processing device operating as a primary processor for data residing in a first portion of an array of storage devices;

scanning a volatile memory device for modified data records;

creating a table of modified data in a second non-volatile memory device;

transferring said modified data records to said back-up storage device in the form of said table of modified data; and writing said modified data records to the back-up storage device, wherein said modified data records are analogous to data stored in a second non-volatile memory device.

14. The method of claim 13, further including transferring a redundant copy of the data stored in the first non-volatile memory device with second computer processing device identical and redundant to the first computer processing device, the second computer processing device operating as a secondary processor for data residing within a second portion of the array of storage devices.

\* \* \* \* \*